United States Patent [19]

Mylander

[11] 4,191,208
[45] Mar. 4, 1980

[54] AUTOMATIC FILL-STOP VALVE

[76] Inventor: Gerald D. Mylander, 1232 W. Collins, Orange, Calif. 92667

[21] Appl. No.: 833,020

[22] Filed: Sep. 14, 1977

[51] Int. Cl.² .............................................. F16K 21/18
[52] U.S. Cl. .................... 137/393; 137/158; 141/198; 141/302; 251/25
[58] Field of Search ............ 137/158, 390, 393, 625.6, 137/386; 141/95, 198–229, 301–306; 251/25

[56] References Cited
U.S. PATENT DOCUMENTS

| | | | |
|---|---|---|---|
| 1,020,642 | 3/1912 | Elkofer | 137/393 |
| 2,555,483 | 6/1951 | Grant, Jr. | 251/25 |
| 2,627,873 | 2/1953 | Bothe | 251/25 |
| 2,646,817 | 7/1953 | Cox et al. | 137/393 |
| 2,648,349 | 8/1953 | McGarry | 251/25 |
| 2,967,541 | 1/1961 | Norway et al. | 137/393 |
| 3,132,663 | 5/1964 | Abbott | 141/198 |
| 3,363,641 | 1/1968 | Mylander | 137/393 |

Primary Examiner—Martin P. Schwadron
Assistant Examiner—G. L. Walton
Attorney, Agent, or Firm—Allen A. Dicke, Jr.

[57] ABSTRACT

The automatic fill-stop valve passes the liquid filling a tank. A level-sensing tube passes vapor until the tank liquid level rises that high, and, thereupon, passes liquid. Serial orifices in the sensing passage produce a valve closing signal when the liquid level reaches the sensing tube to automatically stop the filling of the tank.

6 Claims, 3 Drawing Figures

U.S. Patent    Mar. 4, 1980    4,191,208
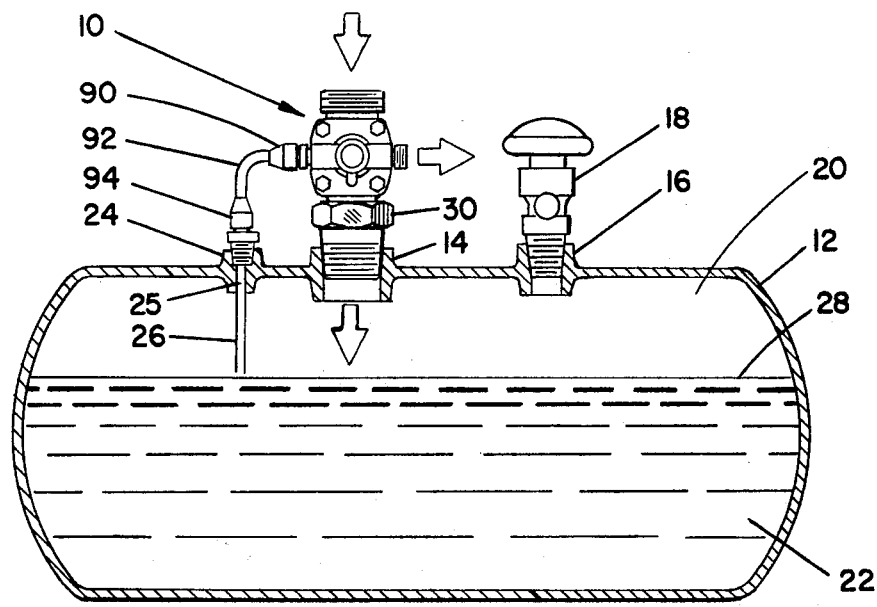
FIG. 1
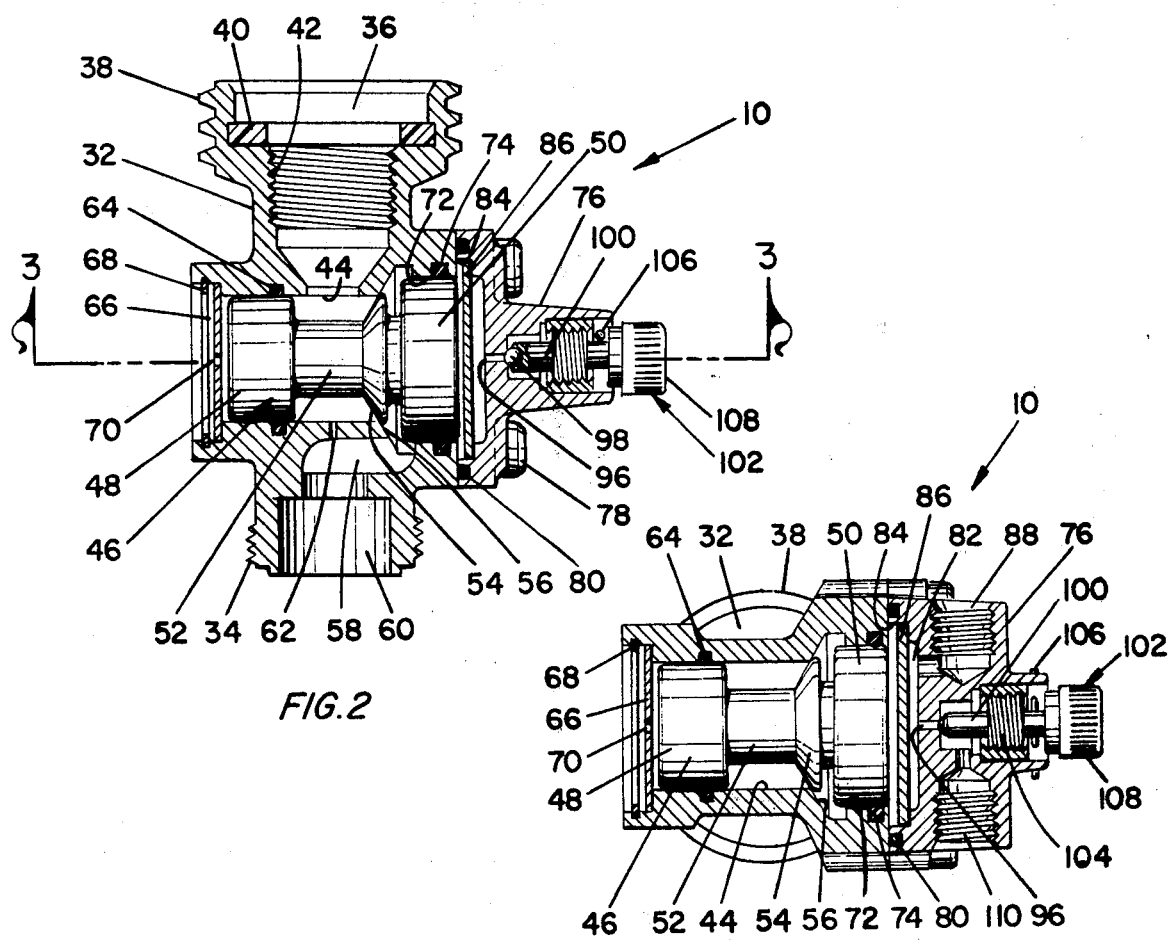
FIG. 2
FIG. 3

4,191,208

AUTOMATIC FILL-STOP VALVE

BACKGROUND

This invention is directed to an automatic fill-stop valve and particularly a valve suitable for stopping the filling of liquid propane tanks when the liquid level therein reaches a predetermined level to prevent tank overfilling.

Liquefied petroleum gas, including propane and butane, is extensively used for household cooking and heating where natural gas or manufactured gas is unavailable. Furthermore, liquefied petroleum gas is used for these purposes on recreational vehicles for these same purposes. Liquefied petroleum gas is extremely volatile and burns readily. In the liquefied state, the vapor pressure of propane and butane is such that the liquid can be stored in tanks of only moderate strength in outdoor locations at the ambient temperatures encountered. These characteristics make liquefied petroleum gas extremely desirable for use as fuels. In addition to cooking and space heating, the gases are employed as internal combustion engine fuel and as process gas.

Liquefied petroleum gas must be handled very cautiously due to its characteristics. For example, liquefied propane and butane have boiling points lower than the normal atmospheric temperatures. Thus, they vaporize readily under normal ambient temperature conditions. The vapor pressure is sufficiently high that they are volatile at ordinary outdoor ambient temperatures, at atmospheric pressure. However, the pressure can be contained in the tank in reasonable thickness so that the volatility provides the tank pressurization which supplies the gas to its point of use.

In addition to the foregoing characteristics, these liquefied petroleum gases have extremely high thermal coefficients of expansion such that even moderate changes in temperature thereof cause the liquid to expand or contract appreciably. For this reason, it is necessary to maintain a void or head space in a tank where the liquefied petroleum gas is stored. A portion of the volume of any such tank must be left unoccupied with the liquid to allow for expansion upon increase in temperature. In fact, most states now prohibit the filling of any such tank with liquefied gas beyond a certain percentage of the volume of the tank.

The most common present device for determining maximum tank fill comprises a level-sensing dip tube which extends down into the tank to the point of highest proper liquid level in the tank. The dip tube vents outside the tank and has a manual valve thereon. The manual valve is opened, and filling is commenced. Vapor from the tank head space is discharged out of the open manual valve and, when the tank is filled with liquid to the bottom of the dip tube, the liquid level is sensed thereat by the liquid discharging from the manual valve. The liquid expands and vaporizes as it reaches the atmosphere, thus creating a telltale white cloud. When seeing such a cloud, the operator shuts off the fill valve and terminates the filling operation.

Of course, such a system requires that the filling operator remain alert, because he must turn off the fill valve at the proper time. If the operator fails to respond at the right time, the tank can be filled considerably above the safe limit. Thereafter, in the event of even a moderate increase in temperature of the liquid, the liquid can expand to fill the entire tank. Further expansion would cause a rapid increase in pressure and could rupture the tank. With tank rupture, an extremely hazardous condition occurs when the volatile liquid and vapor is spilled. A spark can produce a destroying fire.

To prevent the occurrence of such hazardous conditions, it is apparent that an automatic fill-stop valve is required. G. D. Mylander U.S. Pat. No. 3,363,641 illustrates an automatic flow control valve which is responsive to the liquid level so that filling is stopped. This prior automatic flow control valve is arranged so that both the filling flow and the level-sensing flow are automatically shut off, but the price of the end product was too high. Commercial acceptability demanded that the valve be produced at a considerably lower cost without sacrificing quality and reliability. It was not immediately apparent that the automatic shutting off of the level-sensing flow added an unnecessary function which made for a higher valve cost than was necessary to accomplish the basic function.

SUMMARY

In order to aid in the understanding of this invention, it can be stated in essentially summary form that it is directed to an automatic fill-stop valve wherein a level-sensing dip tube supplies first vapor flow and thereafter liquid flow through a first control orifice to the valve drive chamber and then out through the manually controlled vent orifice so that a change from vapor to liquid flow causes a valve-closing pressure increase in the drive chamber.

It is thus an object of this invention to provide an automatic fill-stop valve which stops the filling of a liquefied petroleum gas tank when the liquid level has reached a predetermined point. It is a further object to provide an automatic fill-stop valve which has a manual vent valve for controlling the flow of vapor from the head space in the tank so that the fill valve is shut off when liquid is sensed in the manually controlled level-sensing line. It is a further object to provide an automatic fill-stop valve which has a manual vent valve which is the same as the present manual vent valve employed with present filling equipment which does not have automatic fill-stop structure so that operators need not learn a new filling procedure.

Other objects and advantages of this invention will become apparent from a study of the following portion of the specification, the claims and the attached drawings.

BRIEF DESCRIPTION OF THE DRAWINGS

FIG. 1 is a longitudinal section through a liquefied petroleum gas tank equipped with the automatic fill-stop valve of this invention.

FIG. 2 is an enlarged longitudinal section through the automatic fill-stop valve in a plane normal to FIG. 1.

FIG. 3 is a section through the automatic fill-stop valve taken generally along the line 3—3 of FIG. 2.

DESCRIPTION OF THE PREFERRED EMBODIMENT

The automatic fill-stop valve of this invention is generally indicated at 10 in FIGS. 1, 2 and 3. In FIG. 1, it is shown as being mounted on tank 12. Tank 12 has inlet boss 14 formed thereon for the reception of valve 10. Tank 12 also has outlet boss 16 formed thereon for attachment of outlet valve 18. Since outlet boss 16 is not equipped with a dip tube, outlet valve controls the discharge of vapor from vapor space 20 of the tank. If desired, this outlet boss or another outlet boss can be equipped with a dip tube which reaches adjacent the bottom of the tank into the liquid 22 in the tank so that liquid can be discharged. The tank can be equipped for both vapor and liquid discharge from separate outlet valves, if desired. Tank 12 is also equipped with boss 24 in which is mounted level-sensing tube 26. Tube 26 reaches down far enough in the tank so that, when the top 28 of the liquid reaches the bottom of level-sensing tube 26, then the ratio of the volume of vapor space 20 to the entire tank volume is the desired volume. In present equipment, the volume of vapor space 20 is determined by several factors, including tank size, gas type and temperature range. A particular valve is 20 percent of the entire tank volume.

The tank structure indicated is that which is approved by the American Society of Mechanical Engineers. The ASME-approved tank has separate bosses for each function. The tank approved by the U. S. Department of Transportation has only one boss through which the filling, discharge and sensing functions are all accomplished. It can be seen from the following description of the automatic fill-stop valve of this invention that all functions can be combined in a single housing to attach to a single boss on the tank so that the automatic fill-stop valve 10 of this invention is also applicable to DOT-approved tanks. The standards apply to liquefied petroleum gas tanks particularly suited for use with butane and propane. When employed in the ASME-approved tank 12 illustrated in FIG. 1, check valve 30 is fitted between automatic fill-stop valve 10 and boss 14. Check valve 30 prevents substantial leakage should the automatic fill-stop valve 10 fail. Check valve 30 is a commercial item and employs two serially-fitted check valves therein to prevent substantial outflow of petroleum vapor. As is seen in FIG. 1, check valve 30 is screwed into boss 14 by means of conventional pipe threads. As is seen in FIG. 2, body 32 is fitted with straight threads 34 at the outlet of the body for threaded attachment into check valve 30. Sealing of the check valve on the body 32 is accomplished by an opening clamped therebetween.

Boss 24 has orifice 25 formed as an integral part thereof. Orifice 25 is provided to limit flow so that any damage to structure attached to boss 24 will not permit the free escape of liquefied petroleum gas in tank 12. Tanks which are not equipped with automatic fill-stop valve 10 have a manual vent valve in boss 24. Should this manual vent valve be left open or should it be damaged, the outlet of gas from boss 24 is diminished to relatively safe flow by orifice 25. The size of orifice 25 is the size of a hole drilled by a number 54 drill (0.55 inch or 1.4 millimeters).

Valve body 32 has inlet opening 36 in its upper end. Attachment of a liquefied petroleum gas filling nozzle to the inlet opening is accomplished by the external acme thread 38 and its companion internal seal gasket 40. This is the industry standard for connection. In order to provide versatility, inlet opening 36 is also provided with internal threads 42 which receive a fill fitting built to DOT standards. Thus, either kind of fill nozzle can be attached to the inlet end of valve body 32. Inlet opening 36 joins crossbore 44 which contains valve spool 46. Valve spool 46 carries small piston 48 on the left end thereof and large piston 50 on the right end thereof. To the right of its narrow central neck 52, valve spool 46 carries valve disc 54. Valve disc 54 seats against valve seat 56 in body 32 and at the right end of crossbore 44. In the flow direction beyond valve seat 56, channel 58 is open to outlet 60 at the lower end of the valve body. It is outlet 60 that is connected by threads 34 to check valve 30. Equalizer channel 62 connects outlet channel 58 to inlet channel 42 by being drilled through the web which separates the two channels. When valve spool 46 is to the left where disc 54 is against seat 56, then the only interconnection between the inlet and the outlet is through equalizer channel 62. When valve spool 46 is to the right, then the outlet channel 36 is open to the outlet channel 58 through the space between disc 54 and seat 56.

Small piston 48 is sealed with respect to crossbore 48 by means of O-ring 64. Cover disc 66 engages against the shoulder at the left end of bore 44 and is held in place by means of snap ring 68. Vent opening 70 in cover disc 66 communicates the atmospheric pressure to the left end of small piston 48. Cover disc 66 prevents manual engagement which would thrust valve spool 46 to the right which would open the valve. Cover disc 66 thus prevents inadvertent valve opening.

Body 32 also has large bore 72 therein in which large piston 50 engages. Large piston 50 is sealed with respect to the bore by means of O-ring 74. In this way, the piston can reciprocate through crossbore 44. It is subject to the pressure acting on the various piston areas.

Cap 76 is positioned over large bore 72 and is held in place by four capscrews 78. Sealing of the cap on valve body 32 is accomplished by O-ring 80. Cap 76 has drive chamber 82 therein. Drive chamber 82 includes cylindrical bore 84 in which is seated ram disc 86. Ram disc 86 has an annular space therearound to permit equalization of the pressure across the ram disc over a time. However, the annular clearance around the ram disc is sufficiently small so that short-term differential pressure causes motion of the disc. As is seen in FIGS. 2 and 3 where valve spool 46 is in its closed position, when the valve spool is in the right-hand open position, ram disc 86 is in the right side of its cylindrical bore 84 and valve spool 86 lies against it.

Inlet fitting opening 88 in cap 76 receives inlet fitting 90, see FIG. 1. Also, as is shown in FIG. 1, tube 92 connects inlet fitting 90 with fitting 94 in boss 24, which carries orifice 25 and level-sensing tube 26. In this way, the presence of liquid or vapor at the bottom of level-sensing tube 26 is communicated to drive chamber 82.

Outlet orifice 96 communicates from drive chamber 82 to the underside of ball 98, which serves as the disc on stem 100 of vent valve 102. Stem 100 carries threads 104 which are threaded into cap 76. Crosspin 106 engages in the neck between threads 104 and knurled cap 108 to prevent complete removal of the stem of vent valve 102 from cap 76. Ball 98 is held in place by rolling the edges of the stem around the ball. Ball 98 seats against the outer corner of outlet orifice 96 to form a proper gas seal. The chamber around stem 100 is communicated to the atmosphere through vent fitting opening 110. The fitting opening may be directly open to the atmosphere, but where remote discharge of the liquid petroleum gas or its vapor is desired, a fitting and vent tubing can be supplied.

In reviewing the operation of the automatic fill-stop valve 10, in the initial condition it is assumed that the valve is in the quiescent, no-filling state. In this condition, there is some liquid 22 in tank 12, but the level of the liquid is below the bottom of level-sensing dip tube 26. Considering the forces on valve spool 46, the left end of small piston 48 is always to atmosphere. Using atmospheric pressure as reference zero, that area does not apply a force to the piston. The left face of large piston 50 is larger than the right face of small piston 48 by a differential area. Since those faces are always at tank pressure by virtue of equalizing vent 62, then the force of tank pressure times the differential area urges the spool to the right, toward the open position. The amount of closing force produced by the pressure in chamber 82 times the area of the right end of large piston 50 against the opening force determines the valve motion and position.

In the initial condition, vent valve 102 is closed, and a cap closes inlet opening 36 by its being screwed down over threads 38. In this no-flow condition, the pressure of the tank is communicated to drive chamber 82 by the vapor 20 supplying pressure through level-sensing dip tube 26, through orifice 25, line 92, and opening 88 into drive chamber 82. The pressure in drive chamber 82 is communicated around the edges of the ram disc to the end of large piston 50. With tank pressure communicated to the large piston area, there is a net force holding valve spool 48 in the leftward, closed position, as shown in FIGS. 2 and 3.

When tank 12 is to be filled, the cap is removed from inlet opening 36 and a filling line is connected thereto. Liquefied petroleum gas is supplied to inlet opening 36. However, in view of the balanced pressures, spool 46 remains in the leftward, closed position. When the filling attendant manually opens vent valve 102, vapor flow passes through first or tank orifice 25 through drive chamber 82 and thence out of second or outlet orifice 96 to vented atmospheric pressure. In view of the relative sizes of the first and second orifices 25 and 96, the pressure in drive chamber 82 drops below its previous value to about 20 percent of tank pressure. In this condition, the tank pressure acts on the differential area, and this force is greater than 20 percent of tank pressure acting on the large piston so that the total net force is an opening force to move the valve spool 46 to the right, to open the valve so that filling can start.

Now, liquid petroleum gas is passing in through inlet opening 36, through crossbore 44, and past the narrow open valve disc and valve seat 54 and 56, down through channel 58 and out of outlet 60 into tank 12. As filling proceeds, the top of the liquid 28 rises. When the top of the liquid rises to the bottom of level-sensing dip tube 26, then liquids passes up through the level-sensing tube, through orifice 25, tube 92, and into drive chamber 82. When the liquid reaches outlet orifice 96, there is a rapid rise in pressure in drive chamber 82. The orifice is sized so that, in liquid flow, the pressure in drive chamber 82 rises to about 60 percent of tank pressure. This pressure produces a net force on the valve spool 46 in the leftward, closed position.

The ordinary force balances changing, as described above, are enough to shift the valve spool. However, stickiness due to starting friction or dirt may cause valve shifting delay, particularly at low tank pressure. To augment the normal closing force, ram disc 86 has a larger area toward chamber 82 than does the large piston. When the pressure rises in drive chamber 82 due to the arrival of liquid, ram disc 86 is momentarily subjected to the higher pressure on the right-hand side while temporarily having the previous lower pressure on the left-hand side. The slight leakage around the edges of ram disc 86 in cylindrical bore 84 maintains the differential pressure and consequent closing force for a short time. In this way, the larger area of ram disc 86 is temporarily acted upon by the higher pressure due to the arrival of the liquid. This thrusts ram disc 86 to the left. In the open condition, valve spool 86 would be lying against the ram disc so that this thrust of the ram disc to the left causes leftward motion of valve spool 46 to cause closing of the valve.

With the valve closed and with liquid flowing through the level-sensing system including the two orificies 25 and 96, the pressure on the right-hand of large piston 50 is high enough in the balance of the system to maintain the valve spool in its leftward, closed position. This force balance is true even though the pressures equalize on the two sides of the ram disc. In this state, the liquid pressure in drive chamber 82 results in a leftward force which is greater than the rightward force caused by the tank pressure on the differential area on the large piston 50. Thus, shutoff of inflowing liquid is accomplished and filling is terminated. In this way, filling is automatically stopped when the tank level reaches the bottom of the sensing tube.

The operator next manually closes vent valve 102 to stop the flow to the atmosphere. He removes the filling nozzle and replaces the cap on valve 10. The system is now returned to the original condition.

This invention having been described in its preferred embodiment, it is clear that it is susceptible to numerous modification and embodiments within the ability of those skilled in the art and without the exercise of the inventive faculty. Accordingly, the scope of this invention is defined by the scope of the following claims.

What is claimed is:

1. An automatic fill-stop valve for use in filling tanks for containing liquid which boils under ambient conditions, said fill-stop valve comprising:
   a valve body having a liquid passage therethrough, a bore in said body, a valve spool movably mounted in said bore for moving from a closed position wherein said liquid fill passage is closed to an open position wherein liquid filling can take place, said valve spool having a large piston thereon, said valve body having a drive chamber therein, said large piston being open to said drive chamber so that pressure in said drive chamber moves said spool toward the valve closed position a ram disc bore, in said drive chamber, said ram disc bore being of larger diameter than said large piston, a ram disc in said ram disc bore, said ram disc being movable in said ram disc bore in a direction to urge said valve spool in a valve closing direction, said valve spool lying against said ram disc when said valve spool is in its valve open position;
   a level-sensing system comprising a level-sensing tube and a first orifice in series with said tube, the side of said ram disc away from said valve spool being open to said level-sensing system so that increases in pressure in said level-sensing system urge said ram disc and said valve spool toward the valve closed position, said level-sensing system further including a second orifice and a manually operable valve, said drive chamber being connected to said level-sensing system between said first and second orifices.

2. The automatic fill-stop valve of claim 1 wherein said manually operated vent valve has a ball mounted on the axis thereof and said ball acts as the valve disc.

3. The automatic fill-stop valve of claim 2 wherein said ball seats directly in one of the ends of said second orifice so that said end acts as a valve seat for said ball.

4. The automatic fill-stop valve of claim 1 wherein said manually operable vent valve has a screwthread thereon engaged in a corresponding screwthread in said valve body and has a manually graspable cap thereon for rotating said valve to move said valve into and out of closed position, said valve having a reduced diameter neck therein and having a transverse pin lying adjacent said reduced diameter neck to limit motion of said valve with respect to said body.

5. The automatic fill-stop valve of claim 1 wherein said ram disc has an opening therepast so that fluid pressure equalizes across said ram disc after a time, and pressure increases thrust said ram disc in the valve spool closing direction.

6. The automatic fill-stop valve of claim 1 wherein said valve spool has a large piston and a small piston thereon on which fluid pressure acts, said areas including a differential area, comprised of the large piston less the small piston, exposed to tank pressure to apply force in the valve opening direction and the area of the large piston being exposed to pressure in said drive chamber so that decreases and increases in pressure in said drive chamber respectively cause increases in valve opening and valve closing forces.

* * * * *